United States Patent [19]
Herzog

[11] 4,408,148

[45] Oct. 4, 1983

[54] CONTROLLER FOR A LOCKABLE SERVO MOTOR

[75] Inventor: Rudolf Herzog, Tobel, Switzerland

[73] Assignee: Sulzer Brothers Limited, Winterthur, Switzerland

[21] Appl. No.: 321,613

[22] Filed: Nov. 16, 1981

[30] Foreign Application Priority Data

Dec. 5, 1980 [CH] Switzerland .................. 9006/80

[51] Int. Cl.³ ............................................. G05B 11/42
[52] U.S. Cl. ...................................... 318/610; 364/162
[58] Field of Search .............. 318/610, 609, 561, 590; 364/160–163

[56] References Cited

U.S. PATENT DOCUMENTS

| | | | |
|---|---|---|---|
| 3,946,297 | 3/1976 | Bechtel | 318/609 |
| 4,049,971 | 9/1977 | de Vivy | 318/610 |
| 4,275,439 | 6/1981 | Kuwata | 318/610 |
| 4,303,873 | 12/1981 | Hawkins | 318/610 |
| 4,346,433 | 8/1982 | Rutledge | 318/610 X |

*Primary Examiner*—B. Dobeck
*Attorney, Agent, or Firm*—Kenyon & Kenyon

[57] ABSTRACT

The PI controller for a blockable servo motor comprises a selector having a first, normal operating position in which a difference signal is fed to the I network. In the other position, the output of a subtraction member is fed to the I network. The inputs of the subtraction member receive the input and output of the servo motor. The selector is actuated by means of a comparator which also blocks the servo motor when the difference signal is of small absolute value. In this way, the servo motor is not operated as frequently and yet this does not appreciably impair the control accuracy.

4 Claims, 3 Drawing Figures

CONTROLLER FOR A LOCKABLE SERVO MOTOR

This invention relates to a controller for a lockable servo motor.

As is known, various types of controllers have been used for controlling the output of a plant, for example, via a blockable servo motor. Generally, the controller receives an actual value signal from the plant for comparison with a set value signal. Depending upon the difference between the compared values, a difference signal can be emitted via a control circuit for actuation of the servo motor in an appropriate direction and amount. In this regard, one known control circuit employs an integral network, a proportional network and a summating member. Highly sophisticated controllers of this kind are also known, for example, being provided with highly biased D networks, whereby the servo motors are practically always in operation because of continual small disturbances. As a result, the servo motors may undergo a premature wear. This may, in turn, lead to inaccuracies in operation. Further, because of the continuing small disturbances, the servo motors may be prone to a heating up which might impair reliability.

Accordingly, it is an object of this invention to provide a controller which is capable of extended life and improved reliability.

It is another object of the invention to reduce the control work for a servo motor without appreciably impairing the quality of the control.

It is another object of the invention to reduce the heating of a servo motor controlled by a controller.

It is another object of the invention to minimize the wear on a servo motor controlled by a controller.

Briefly, the invention provides a controller for a lockable servo motor which is comprised of a comparing means, a proportional network, an integral network, a subtraction member, a selector and a comparator.

The comparing means serves to compare an actual value, for example, received from a plant, and a set value in order to generate a difference signal in response to a difference between the two values.

The proportional network is connected to the comparing means to receive the difference signal and to generate a proportional action signal in response thereto.

The integral network is connected to the comparing means in parallel with the proportional network in order to receive the difference signal and to generate an integral action signal in response thereto.

The summating member is connected to the proportional network and the integral network in order to receive and add the produced proportional action signal and integral action signal and thus generate an input signal for the servo motor.

The subtraction member is connected to the summating member to receive the input signal for subtraction from an output signal of the servo motor in order to generate a deviation signal.

The selector has one input connected to the comparing means to receive the difference signal, a second input connected to the subtraction member to receive the deviation signal and an output which is connected to the integral network. In addition, the output is internally connected to the input of the selector receiving the difference signal so as to deliver the difference signal to the integral network.

The comparator is connected to the comparing means to receive the difference signal. In addition, the comparator has an output connected to the selector and a blocking input of the servo motor. In response to the difference signal from the comparing means falling within a preset range of values, the comparator switches the selector output to the selector input receiving the deviation signal in order to deliver this deviation signal via the output to the integral network. At the same time, the comparator delivers a blocking signal to the blocking input of the servo motor.

The operation of the controller is such that the servo motor is put into operation only if the difference signal generated by the comparing means falls outside the preset range set in the comparator. Thus, the amount of control work required by the servo motor is reduced. Further, this reduction can be carried out without appreciably impairing the quality of the control while at the same time extending the control system life and the reliability of the controller. In addition, the servo motor is less prone to heating as a result of the reduction in the amount of control work. Hence, there is less wear on the parts of the servo motor. The controller may also be provided with a differential network, a second comparator and an AND gate in order to reduce the response time of the controller in the event of a disturbance from a state of rest. In this case, the differential network is connected to the comparing means in parallel with the first comparator in order to generate a derivative action signal in response to a received difference signal. The second comparator is connected in series with the differential network in order to receive this derivative action signal while the AND gate is connected between and to the two comparators on an input side as well as to the selector on the output side. The gate functions so that in response to the reception of signals from each of the comparators, the gate switches the selector output to the selector input receiving the deviation signal. Thus, in the event of a disturbance from the state of rest, the response time of the controller is reduced for an identical width of the band, i.e., preset range of values in the comparator, in which the controller is stationary. As a result, even a slight impairment of control quality can be practically eliminated.

The controller may also be modified so as to have a simpler circuit, to some extent, to simplify the adjustment of the controller. To this end, the controller is provided with a differential network which is connected to the comparing means in order to generate a derivative action signal in response to the difference signal. In addition, a first absolute value former is connected in series with the differential network to generate an absolute value signal in response to the derivative action signal while a second value former is connected to the comparing means in parallel with the differential network in order to generate an absolute value signal in response to the difference signal. In addition, a summation point is connected to the two value formers for summing the absolute value signals. The summation point is also connected to the comparator in order to deliver the summed signals thereto. In this way, in response to the summed signals exceeding a preset value, the comparator delivers an actuating signal to the selector in order to switch the selector output to the selector input receiving the deviation signal while also delivering a blocking signal to the blocking input of the servo motor.

These and other objects and advantages of the invention will become more apparent from the following detailed description taken in conjunction with the accompanying drawings wherein.

Figure 1:
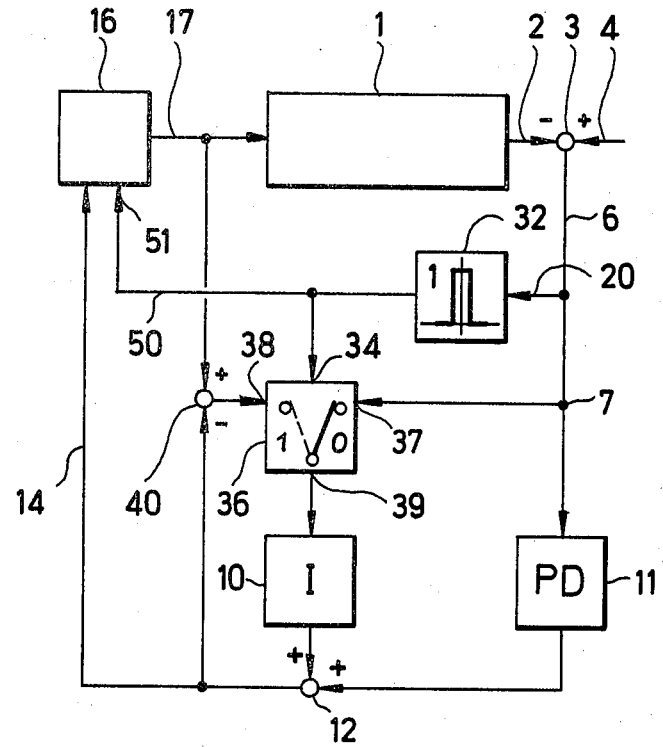
FIG. 1 illustrates a schematic view of a controller constructed in accordance with the invention.

Referring to FIG. 1, the controller is associated with a plant 1 and a blocking servo motor 16 which controls an operation carried on in the plant 1.

The controller includes a comparing means in the form of a comparison member 3 which receives an actual value of a process variable within the plant 1 via a signal line 2 as well as a set value for the process variable from a suitable source via a line 4. The comparison member 3 functions to compare the actual value with the set value and to generate a difference signal in response to a difference occurring between the two values. The comparison member 3 emits the difference signal via a signal line 6 which branches at a point 7 and connects to an integral (I) network 10 and a proportional-differential (PD) network 11 which are connected in parallel with one another. The integral network functions to receive the difference signal and to generate an integral action signal in response thereto. The proportional-differential network 11 functions to receive the difference signal and to generate a proportional-derivative action signal in response thereto. Both the networks 10, 11 are connected to a summating member 12 which functions to receive and add the integral action signal and proportional-derivative action signal in order to generate an input signal for the servo motor 16. As indicated, the summating member 12 is connected to an input of the servo motor 16 via a line 14 through which the input signal is carried. The servo motor 16 is in turn, connected to the plant 1 via a connection 17 to emit a control signal thereto for controlling the process variable therein.

The controller also includes a comparator 32 which is connected via a branch line 20 to the signal line 6 leading from the comparison member 3. The comparator 32 receives the difference signal and, depending upon the magnitude of the input signal, forms a digital output signal 0 or 1. The signal 1 is emitted when the absolute value of the difference signal falls within a preset range of two values, i.e. below a set top threshold and above a bottom threshold.

The comparator 32 has an output which is connected to an input 34 of a selector 36 and, via a line 50, to a blocking input 51 of the servo motor 16.

The selector 36 has two inputs 37, 38 and one output 39. One input 37 is connected to the branch point 7 to receive the difference signal while the second input 38 is connected to a subtraction member 40. The output 39 is connected to the input 37 as well as to the integral network 10 in order to deliver the difference signal to the integral network 10.

The subtraction member 40 is connected to the summating member 12 in order to receive the input signal as well as to the connection 17 to receive the output signal of the servo motor 16. The subtraction member 40 serves to subtract the input signal from the summating member 12 from the control signal of the servo motor 16 in order to generate a deviation signal when a difference occurs between the two signals. This deviation signal is emitted to the input 38 of the selector 36.

The controller operates as follows. If the plant 1 is subjected to a disturbance or if the set value is changed, the signal line 6 carries a continuously varying difference signal. If this difference signal stays outside the narrow band set at the comparator 32, the output signal of the comparator will be 0. The selector 36 thus remains in the position illustrated so that the integral network 10 remains parallel to the proportional-differential network 11 between the branch point 7 and the summating member 12. The controller thus behaves like a conventional PID controller.

If the disturbance at the plant 1 disappears or if the set value in the line 4 remains unchanged, the difference signal fed to the comparator 32 lies within the band determined by the two thresholds. Thus, the output signal of the comparator 32 assumes the value 1. The selector 36 is thus switched over into the position shown in dotted line so that the input 38 is connected to the output 39. Thus, the input of the integral network 10 is switched from the signal line 6 to the subtraction member 40. At the same time, the comparator 32 emits the signal 1 as a blocking signal to the blocking input 51 of the servo motor. As a result, the servo motor 16 is stopped.

By disconnecting the integral network 10 from the signal line 6, small insignificant deviations are prevented from being summated therein since this would result in unnecessary hunting. By simultaneously switching the integral network 10 to the subtraction member 40, the integral network 10 appropriately follows any varying output signal of the PD network 11 so that no abrupt changeover occurs on a return of the selector 36 to the position O wherein the output 39 is connected to the input 37.

The servo motor 16 remains blocked for the entire period during which the selector 36 is in position 1. Any disturbances due to noise are thus prevented from acting on the plant 1 from this side. This results in a general smoothing of the control output since such noise disturbances coinciding with other disturbances would, with some probability, result in a considerable disturbance.

By giving the difference signal a tolerance within a specific band width, the control work performed at the servo motor 16 and the resulting wear are reduced while the control is also rendered smooth for significant periods of time.

As a result of the blocking of the servo motor 16, when a disturbance which exceeds the specific band width occurs, the controller reaction is delayed slightly. Given suitable adjustment of the changeover points at the comparator 32, however, this delay is surprisingly small. However, if such a delay is considered a disadvantage, the delay can be greatly reduced by a modification of the kind illustrated in FIG. 2.

Figure 2:
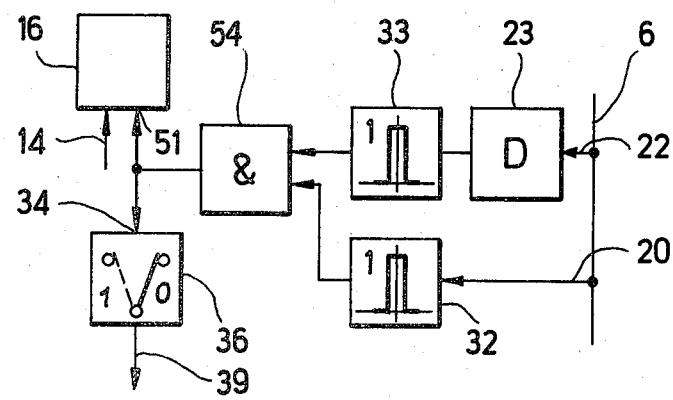
FIG. 2 illustrates a modified portion of the controller circuit of FIG. 1.

Referring to FIG. 2, wherein like reference characters indicate like parts as above, the controller may be provided with a second branch line 22 which is connected to the signal line 6 in parallel with the branch line 20. This second branch line 22 is also provided with a differential (D) network 23 and a second comparator 33 connected in series. In addition, the comparators 32, 33 are connected in parallel to respected inputs of a logic AND gate or network 54. The AND gate 54, in turn, has an output which is connected to the input 34 of the selector 36 and the blocking input 51 of the servo motor 16.

During operation, the differential network 23 receives the difference signal and generates a derivative action signal in response thereto. The comparator 33 then receives the derivative action signal and, as in the case of the comparator 32, emits a control signal 1 if the difference signal falls within a preset range of values. The AND gate 54 delivers an output signal if, and only if, the outputs of the two comparators 32, 33 both carry the signal 1. As with the circuit of FIG. 1, the output of the AND gate 54 is connected to the actuating input 34 of the selector 36 and to the blocking input 51 of the servo motor 16.

As noted above, the advantage of the circuit illustrated, in part, in FIG. 2 is that, given a suitable biassing of the differential network 23, the controller reacts more rapidly from the block state in the event of an abrupt disturbance.

Figure 3:
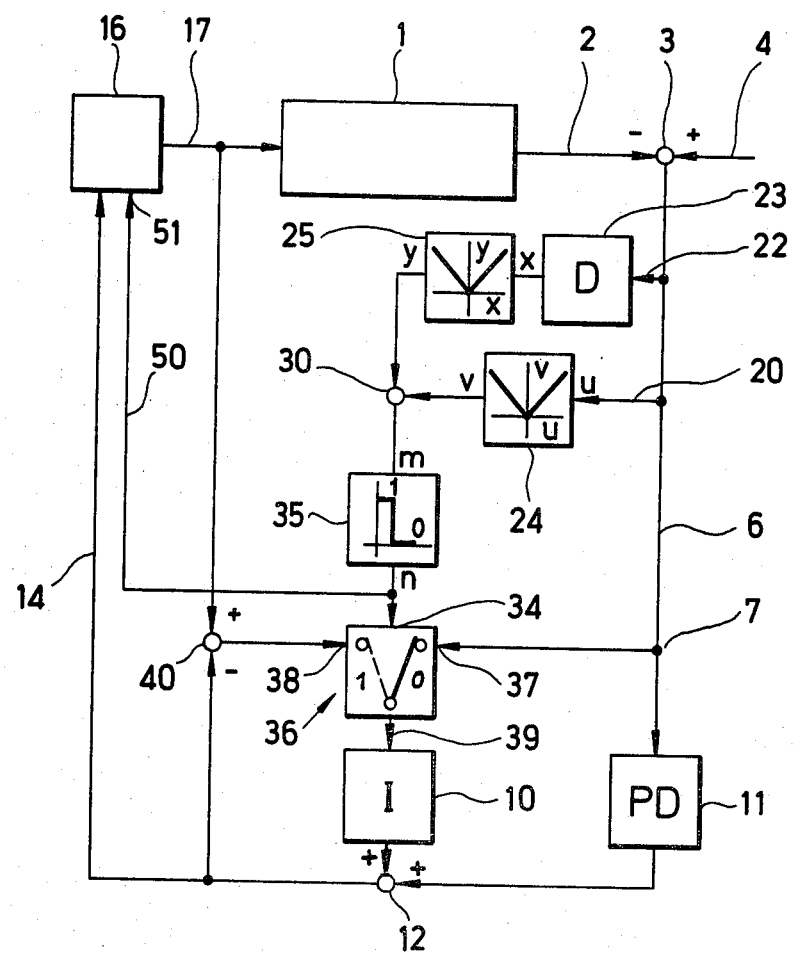
FIG. 3 illustrates a schematic view of a modified controller constructed in accordance with the invention.

Referring to FIG. 3, wherein like reference characters indicate like parts as above, the controller may be constructed in an alternative manner. As illustrated, a pair of branch lines 20, 22 are connected in parallel to the signal line 6 to receive the difference signal. One branch line 22 contains a differential network 23 and an absolute value former 25 which are connected in series while the other branch line 20 contains a second absolute value former 24. The outputs of the two absolute value formers 24, 25 are connected to a common summation point 30 which has an output connected to a comparator 35 of similar construction to the comparators 32, 33 described above but which is required to process only positive signals. Thus, the comparator 35 has only one changeover point. The comparator 35 has an output which is connected to the input 34 of the selector 36 and to the blocking input 51 of the servo motor 16 in a manner as above.

During operation, the differential network 23 generates a derivative action signal in response to a received difference signal. This derivative action signal is then delivered to the absolute value former 25 which, in turn, generates an absolute value signal in response. In similar manner, the second value former 24 generates an absolute value signal in response to the difference signal. The outputs of the two absolute value formers 24, 25 are then summated at the summation point 30 and the sum signal m is fed to the comparator 35. If the signal m falls outside the preset range, a signal n of value 0 is delivered to the selector 36. Thus, the selector remains in the illustrated position so that the input 37 is connected to the output 39. On the other hand, if the signal m falls within the preset range, a signal n of value 1 is delivered to the selector 36 so that the input 38 becomes connected to the output 39. At the same time, the signal is delivered to the blocking input 51 of the servo motor.

In comparison with the controller constructed in accordance with FIG. 2, the controller of FIG. 3 is cheaper to manufacture and quicker to adjust.

It is to be noted that the controller construction is not limited to the exemplified embodiments. For example, the selector 36 illustrated in the drawings could be replaced by contactless components, for example, in the form of two multipliers. The both inputs of the first multiplier would be connected to the output of the subtraction member 40 and to the output of the comparator 35 (FIG. 3) respectively. In addition, the both inputs of the second multiplier would receive the difference signal on the one hand and the inverted output signal of the comparator 35 on the other hand. The outputs of the two multipliers would then be fed in summated form to the integral network 10.

In addition, additional means can be provided in the embodiment of FIG. 3 whereby the changeover point of the comparator 35 would be adjusted, depending upon the ratio of the sign of the difference signal to that of the differential of the difference signal, so that when the two signs are unequal, the changeover point is shifted towards a higher absolute value.

The selector 36 may also be influenced by a higher variable than the first derivative of the difference signal or by a third variable taken, for example, from the plant 1.

It is particularly advantageous for the controller to be highly sophisticated, for example, by the use of a state-observer.

What is claimed is:

1. A controller for a blockable servomotor comprising comparing means for comparing an actual value and a set value to generate a difference signal in response to a difference therebetween;

a proportional network connected to said means to receive said difference signal and to generate a proportional action signal in response thereto;

an integral network connected to said means in parallel with said proportional network to receive said difference signal and to generate an integral action signal in response thereto;

a summating member connected to said networks to receive and add said proportional action signal and said integral action signal to generate an input signal for the servomotor;

a subtraction member connected to said summating member to receive said input signal for subtraction from an output signal of the servomotor to generate a deviation signal;

a selector having one input connected to said means to receive said difference signal, a second input connected to said subtraction member to receive said deviation signal, and an output connected to said first input and said integral network to deliver said difference signal thereto; and a comparator connected to said means to receive said difference signal, said comparator having an output connected to said selector and a blocking input of the servomotor whereby in response to said difference signal falling within a preset range of values, said comparator switches said selector output to said second selector input to deliver said deviation signal to said integral network and delivers a blocking signal to a blocking input of the servomotor.

2. A controller as set forth in claim 1 which further comprises a differential network connected to said means in parallel with said comparator to generate a derivative action signal in response to said difference signal, a second comparator connected in series with said differential network to receive said derivative action signal and an AND gate connected between and to said comparators and said selector whereby in response to receiving signals from each of said comparators, said AND gate switches said selector output to said second selector input to deliver said deviation signal to said integral network and delivers a blocking signal to a blocking input of the servomotor.

3. A controller as set forth in claim 1 which further comprises a differential network connected to said means to generate a derivative action signal in response to said difference signal, a first absolute value former connected in series with said differential network to generate an absolute value signal in response to said derivative action signal, a second absolute value former connected to said means in parallel to said differential network and said first absolute value former to generate an absolute value signal in response to said difference signal, and a summation point for summing said absolute value signals, said summation point being connected to said comparator to deliver said summed signals thereto whereby in response to said summed signals being within a preset range, said comparator delivers an actuating signal to said selector to switch said selector output to said second selector input and to deliver a blocking signal to the blocking input of the servomotor.

4. In combination,
- a servomotor having a first input to receive an actuating signal, a second input to receive a blocking signal and an output to emit an output control signal for controlling a plant;
- a control circuit for controlling said servomotor, said control circuit including
- a comparing means for comparing an actual value from the plant with a set value to generate a difference signal in response to a difference therebetween;
- a proportional network connected to said means to receive said difference signal and to generate a proportional action signal in response thereto;
- an integral network connected to said means in parallel with said proportional network to receive said difference signal and to generate an integral action signal in response thereto;
- a summating member connected to said networks to receive and add said proportional signal and said integral action signal to generate an input signal for said servomotor;
- a subtraction member connected to said summating member to receive said input signal for subtraction from the output control signal of said servomotor to generate a deviation signal;
- a selector having one input connected to said means to receive said difference signal, a second input connected to said subtraction member to receive said deviation signal, and an output connected to said first input and said integral network to deliver said difference signal thereto; and
- a comparator connected to said means to receive said difference signal, said comparator having an output connected to said selector and said blocking input of said servomotor whereby in response to said difference signal falling within a preset range of values, said comparator switches said selector output to said second selector input to deliver said deviation signal to said integral network and delivers a blocking signal to said blocking input of said servomotor.

* * * * *